(12) United States Patent
Zebolsky

(10) Patent No.: US 6,561,325 B2
(45) Date of Patent: May 13, 2003

(54) VEHICLE SUSPENSION WITH REMOTE SPRING

(75) Inventor: Michael L. Zebolsky, Marshall, MI (US)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 09/909,073

(22) Filed: Jul. 19, 2001

(65) Prior Publication Data
US 2003/0067102 A1 Apr. 10, 2003

(51) Int. Cl.$^7$ .................................................. F16F 9/08
(52) U.S. Cl. ...................... 188/298; 188/318; 267/64.26
(58) Field of Search ........................... 188/298, 314, 188/315, 317, 318, 322.21; 267/64.21, 64.24, 64.26; 180/89.15

(56) References Cited

U.S. PATENT DOCUMENTS

| | | | | |
|---|---|---|---|---|
| 3,168,278 A | * | 2/1965 | Ogden | 188/298 |
| 3,668,870 A | * | 6/1972 | Hall | 267/117 |
| 3,993,294 A | | 11/1976 | Wossner et al. | 267/64 R |
| 4,405,119 A | | 9/1983 | Masclet | 267/64.22 |
| 4,513,845 A | * | 4/1985 | Stephens et al. | 180/89.15 |
| 4,695,226 A | * | 9/1987 | Marchitto et al. | 188/314 |
| 4,776,440 A | * | 10/1988 | Yamada et al. | 16/66 |
| 4,981,309 A | | 1/1991 | Froeschle et al. | 280/707 |
| 5,052,712 A | * | 10/1991 | Raidel | 188/269 |
| 5,775,677 A | * | 7/1998 | Englund | 188/317 |
| 5,957,252 A | | 9/1999 | Berthold | 188/314 |
| 6,086,060 A | | 7/2000 | Berthold | 267/64.15 |
| 6,135,434 A | * | 10/2000 | Marking | 188/315 |
| 6,213,263 B1 | * | 4/2001 | De Frenne | 188/318 |

FOREIGN PATENT DOCUMENTS

JP 63265715 A * 11/1988

* cited by examiner

Primary Examiner—Christopher P. Schwartz
Assistant Examiner—Xuan Lan Nguyen
(74) Attorney, Agent, or Firm—Dykema Gossett PLLC

(57) ABSTRACT

A vehicle suspension is provided. The suspension includes a first assembly that is mounted between the vehicle axle and frame and provides controlling damping of movement of the unsprung mass of the vehicle. The suspension also includes a second assembly that is mounted to the vehicle frame and provides controlled damping of movement of a spring disposed against the vehicle frame. The first and second assemblies are in fluid communication. The suspension allows the spring to be mounted remotely from the vehicle axle and increases roll stiffness of the vehicle by allowing spring reaction points to be moved outboard of the vehicle frame rails.

20 Claims, 3 Drawing Sheets

VEHICLE SUSPENSION WITH REMOTE SPRING

BACKGROUND OF THE INVENTION

1. Field of the Invention

This invention relates to vehicle suspensions and, in particular, to a vehicle suspension in which a spring is mounted remote from the vehicle axle.

2. Disclosure of Related Art

In most conventional vehicle suspensions, one or more springs are disposed between the vehicle axle and the vehicle frame to dampen forces exerted on the vehicle as the wheels of the vehicle follow the road contour. Typically, these springs are mounted in a spring seat formed directly in the axle housing or coupled thereto. The relatively large size of conventional mechanical and air springs, however, renders it difficult to provide adequate space for the springs proximate the axle and increases the difficulty of suspension design. Further, the springs must be disposed relatively far inboard on the axle. As a result, vehicles often lack sufficient roll stiffness.

There is thus a need for a vehicle suspension that will minimize or eliminate one or more of the above-mentioned deficiencies.

SUMMARY OF THE INVENTION

The present invention provides a vehicle suspension that allows a spring to be mounted remote from the vehicle axle.

A vehicle suspension in accordance with the present invention includes a first assembly having a first member and a second member arranged in telescoping relation with the first member for relative movement along a first axis. The first member may be coupled to the vehicle axle while the second member may be coupled to the vehicle frame. The first assembly defines first, second, and third fluid chambers. The first assembly further includes a damping control device that controls fluid flow between the first and second fluid chambers of the first assembly. The inventive suspension also includes a second assembly having a first member and a second member arranged in telescoping relation with the first member for relative movement along a second axis. The second assembly defines first and second fluid chambers and includes a damping control device that controls fluid flow between the first and second fluid chambers. The first fluid chamber of the second assembly is of constant size and is in fluid communication with the third fluid chamber of the first assembly. The second fluid chamber of the second assembly is of variable size. The suspension finally includes a spring disposed against a frame of the vehicle and controlled responsive to movement of the second member of the second assembly.

A vehicle suspension in accordance with the present invention represents a significant improvement as compared to conventional vehicle suspensions. The inventive suspension enables the spring or springs of the suspension to be mounted remotely from the vehicle axle. As a result, less clearance is required in the area around the axle to accommodate the spring(s) thereby enabling easier design and packaging of suspension systems. The inventive suspension also provides greater roll stiffness than conventional systems by moving the reaction points of the spring further outboard. In particular, the first assembly may be mounted between the axle and vehicle frame outboard of the longitudinal frame rails of the vehicle-unlike most conventional mechanical and air springs-because the first assembly can operate a higher working pressures and, therefore, has a smaller diameter than conventional mechanical and air springs. The inventive suspension is also advantageous because compression and rebound damping forces are contained within the first and second assemblies and the suspension separates the rebound damping required for the spring from that required for the unsprung mass of the vehicle.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
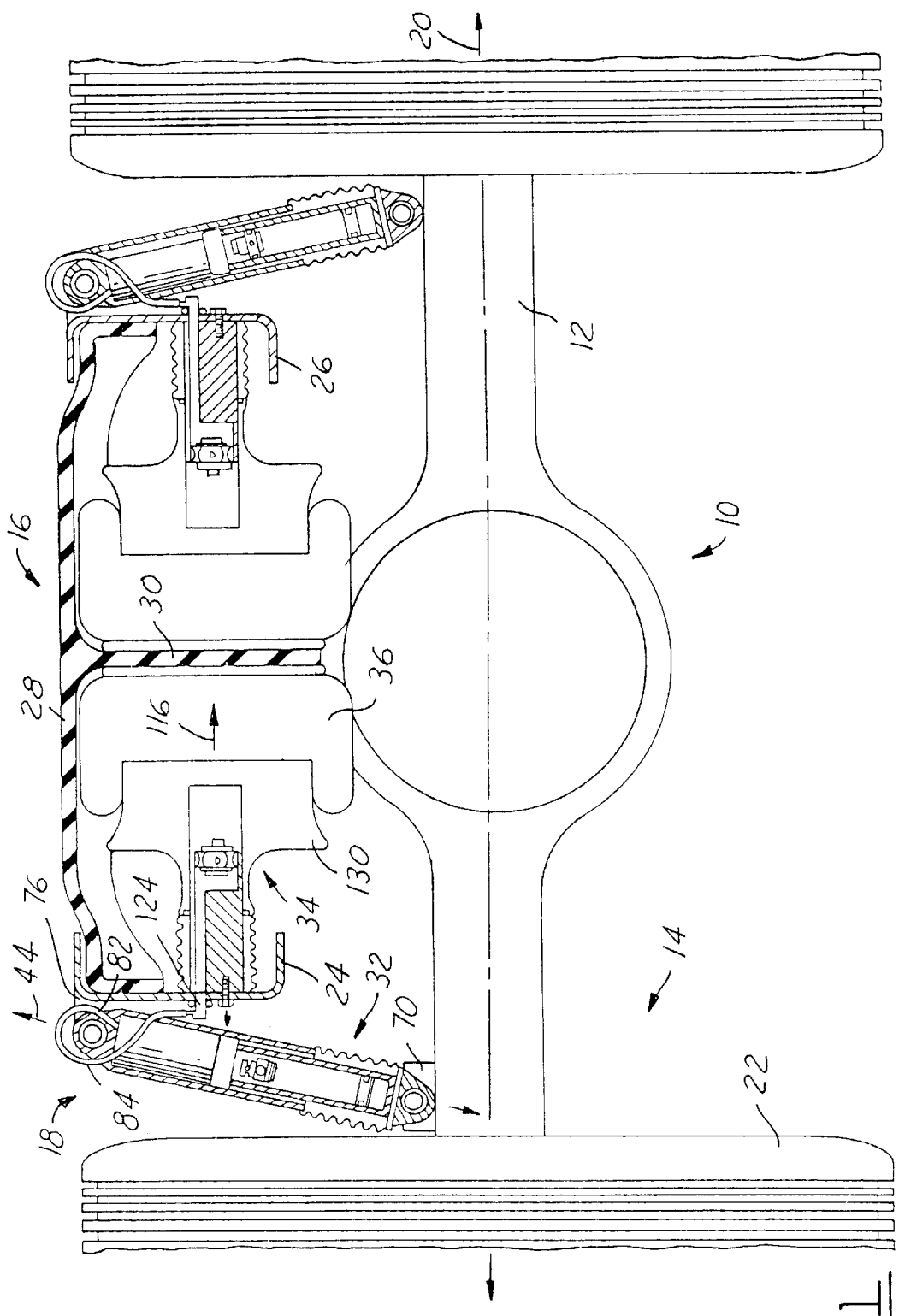
FIG. 1 is a front and partial sectional view of a portion of a vehicle incorporating a vehicle suspension in accordance with the present invention.

Referring now to the drawings wherein like reference numerals are used to identify identical components in the various views, FIG. 1 illustrates a portion of a vehicle 10. Vehicle 10 may comprise a heavy truck. It should be understood, however, that the invention described herein may find application in a wide variety of vehicles. Vehicle 10 may include an axle 12 supporting one or more wheel assemblies 14 on either side of vehicle 10, a frame 16, and a suspension 18 in accordance with the present invention.

Axle 12 is provided to support frame 16 on wheel assemblies 14 disposed proximate either end of axle 12. Axle 12 is conventional in the art any may be made from conventional metals and metal alloys such as steel. Axle 12 may be forged or fabricated. Axle 12 extends along a longitudinal axis 20.

Assemblies 14 are provided to support vehicle 10 and are conventional in the art. Each assembly 14 may include a wheel hub or hubs (not shown), bearings (not shown), and wheels (not shown) supported for rotation on the hub(s) and bearings. Each assembly may also include one or more tires 22 mounted on the wheels.

Frame 16 provides structural support to the body of vehicle 10. Frame 16 is conventional in the art and may be made from conventional metals and metal alloys such as steel. Frame 16 may include a pair of longitudinal rails 24, 26 and one or more cross-members, such as cross-member 28, as is conventional in the art. Rails 24, 26 extend in the longitudinal direction of the vehicle and may be C-shaped in cross-section as is conventional in the art. Cross-member 28 extends transversely between rails 24, 26 and may be coupled to rails 24, 26 by welds or conventional fasteners. In the illustrated embodiment, cross-member 28 includes a vertically descending wall 30 for a purpose described hereinbelow.

Suspension 18 is provided to couple axle 12 to frame 16 and to allow for movement of axle 12 relative to frame 16. In accordance with the present invention, suspension 18 may include a first assembly 32, a second assembly 34, and a spring 36. As shown in FIG. 1, suspension 18 may be replicated on each side of axle 12.

Figure 2:
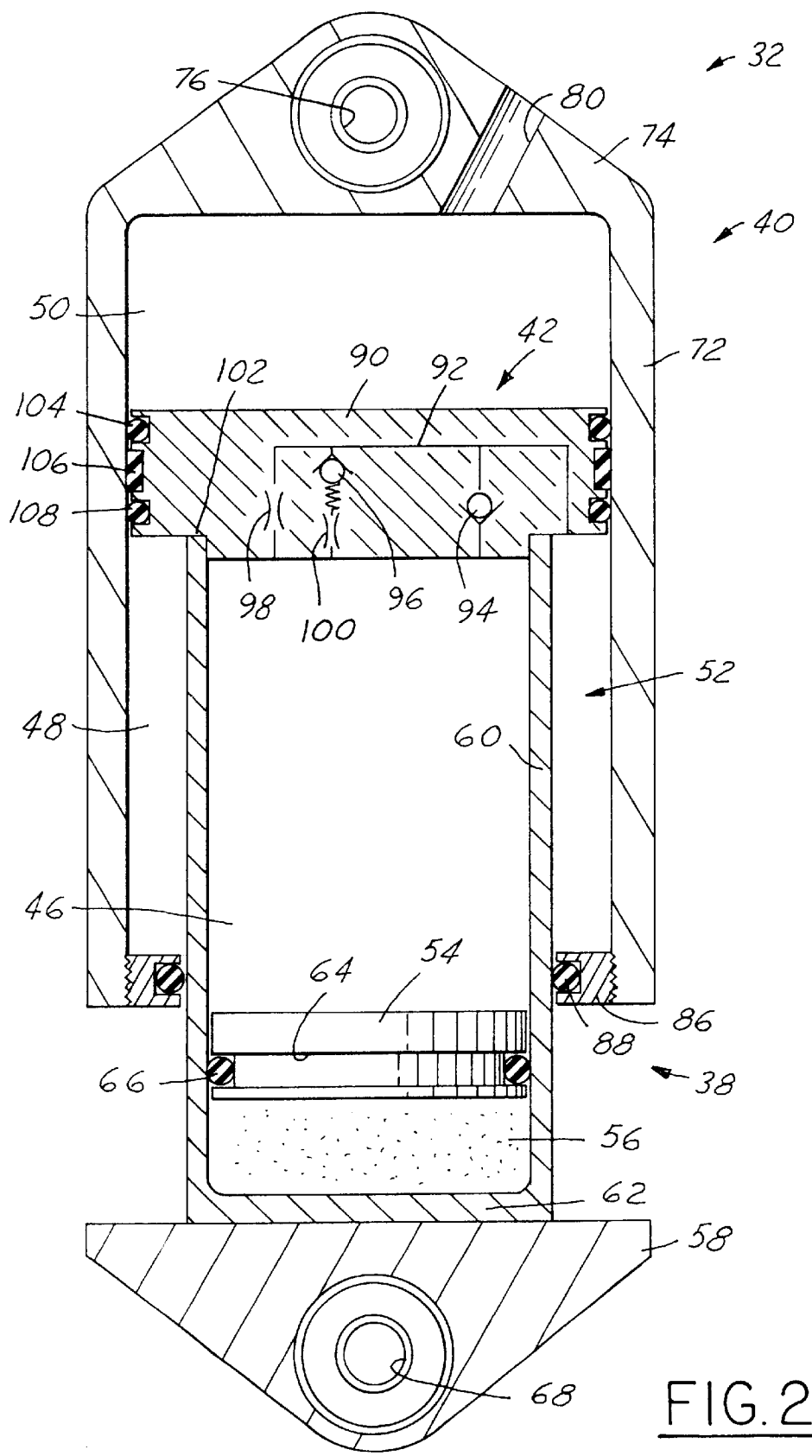
FIG. 2 is a sectional view of one assembly of the suspension of FIG. 1.

Referring now to FIG. 2, assembly 32 provides controlled damping of movement by the unsprung mass of vehicle 10

(i.e. axle 12, wheel assemblies 14, etc.) Assembly 32 may include members 38, 40 and a damping control device 42. Members 38, 40 are arranged in telescoping relation along an axis 44 that may extend generally vertically relative to earth ground as illustrated in FIG. 1. Members 38, 40, together with damping control device 42, may also define several fluid chambers 46, 48, 50.

Member 38 controls the size of chamber during compression and rebound of suspension 18. Member 38 includes a housing 52, a piston 54, means, such as gas 56, for biasing piston 54 in one direction, and a mounting bracket 58.

Housing 52 defines chamber 46 in which a fluid, such as hydraulic fluid, may be disposed. Housing 52 may be made from conventional metals and metal alloys. Housing 52 may include a generally cylindrical wall 60 closed at a first end by an end wall 62. End wall 62 may be integral with cylindrical wall 60 and may be coupled to mounting bracket 58 by, for example, one or more welds. The outer diameter of housing 52 is less than the inner diameter of member 40 thereby defining the size of chamber 48.

Piston 54 provides a predetermined amount of pressure to urge fluid out of chamber 46 through damping control device 42 and into chamber 48. Piston 54 may be made from conventional metals and 15z metal alloys or plastics. The outer diameter of piston 54 is about equal to the inner diameter of wall 60 of housing 52 and defines a groove 64 in which an O-ring seal 66 may be disposed to prevent fluid from leaking past piston 54.

Gas 56 is provided to bias piston 54 in one direction within housing 52. Gas 56 is conventional in the art and may comprise a nitrogen gas or other gas conventional to shock absorbers. Although the biasing means comprises gas 56 in the illustrated embodiment, it should be understood that other means could be employed to bias piston 54 without departing from the spirit of the present invention. For example, a mechanical spring may alternatively be provided to bias piston 54.

Mounting bracket 58 is provided to enable member 38 to be coupled to axle 12 of vehicle 10 as illustrated in FIG. 1. Bracket 58 may include an aperture 68 configured to receive a fastener (not shown) such as a bolt or screw used to couple member 38 to a corresponding mounting bracket 70 on axle 12.

Member 40 is provided to house a fluid such as hydraulic fluid used in damping movement of the unsprung mass. Member 40, together with member 38, defines chambers 48, 50 in which fluids, such as hydraulic fluids, may be disposed. Member 40 may be made from conventional metals and metal alloys and may include a generally cylindrical wall 72 closed at one end by an end wall 74. End wall 74 may be integral with cylindrical wall 72 and may define a mounting bracket for coupling member 40 to frame 16 of vehicle 10 (as illustrated in FIG. 1). In particular, end wall 74 may include an aperture 76 configured to receive a fastener (not shown) such as a bolt or screw and through which member 40 may be coupled to a corresponding mounting bracket 78 of frame 16. End wall 74 may also include a fluid passage 80 extending therethrough. Referring to FIG. 1, passage 80 may be configured to receive a connector 82 at one end of a fluid conduit 84 that places assemblies 32, 34 in fluid communication. Member 40 may further include means for sealing chamber 48. In the illustrated embodiment, the sealing means includes a ring 86 having a first plurality of threads on a radially outer face configured to engage a corresponding plurality of threads on the radially inner face of wall 72 and an O-ring seal 88 disposed in a radially inner groove of ring 84. Seal 88 engages the outer face of wall 72 of member 40.

Damping control device 42 is provided to dampen movement of the unsprung mass during rebound. Device 42 may include a housing 90 have a plurality of fluid passages 92 and a pair of valves 94, 96 disposed within passages 92 in a parallel arrangement. Device 42 may also include an orifice 98 in parallel with valves 94, 96 and an orifice 100 in series with valve 96 to allow fluid to bleed between chambers 46, 48 and allow greater control of fluid flow.

Housing 90 provides structural support for device 42, places chambers 46, 48 in fluid communication, and also is used as a piston to urge fluid out of chamber 50 during compression of suspension 18 and assembly 32. Housing 90 may be made from conventional metals and metal alloys and may be coupled to housing 52 of member 38 through, for example, the interaction of mating threads on housings 52, 90, one or more welds or a press fit. Housing 90 may be generally circular in shape and the outer diameter of housing 90 is generally about equal to the inner diameter of member 38. A reduced diameter portion of housing 90, however, defines a shoulder 102 configured to engage wall 60 of housing 52 of member 38. The radially outer surface of housing 90 defines a plurality of grooves in which seals 104, 106, 108 may be disposed. Seals 104, 106, 108 engage the radially inner surface of member 40 to prevent fluid from leaking between chambers 48, 50.

Valve 94 controls the flow of fluid from chamber 46 to chamber 48 during compression and may comprise a conventional check valve. During compression of suspension 18, member 38 moves inward within member 40. As a result, the size of chamber 48 increases and piston 54 urges additional fluid to flow from chamber 46 to chamber 48 through valve 94.

Valve 96 controls the flow of fluid from chamber 48 to chamber 46 during rebound and may comprise a regulating valve in series with orifice 100. During rebound of suspension 18, member 38 moves outward from member 40. As a result, the size of chamber 48 decreases and fluid pressure forces fluid to flow from chamber 48 to chamber 46. Valve 96 dampens this fluid flow by requiring a predetermined pressure differential between chambers 46, 48 to allow fluid flow.

Figure 3:
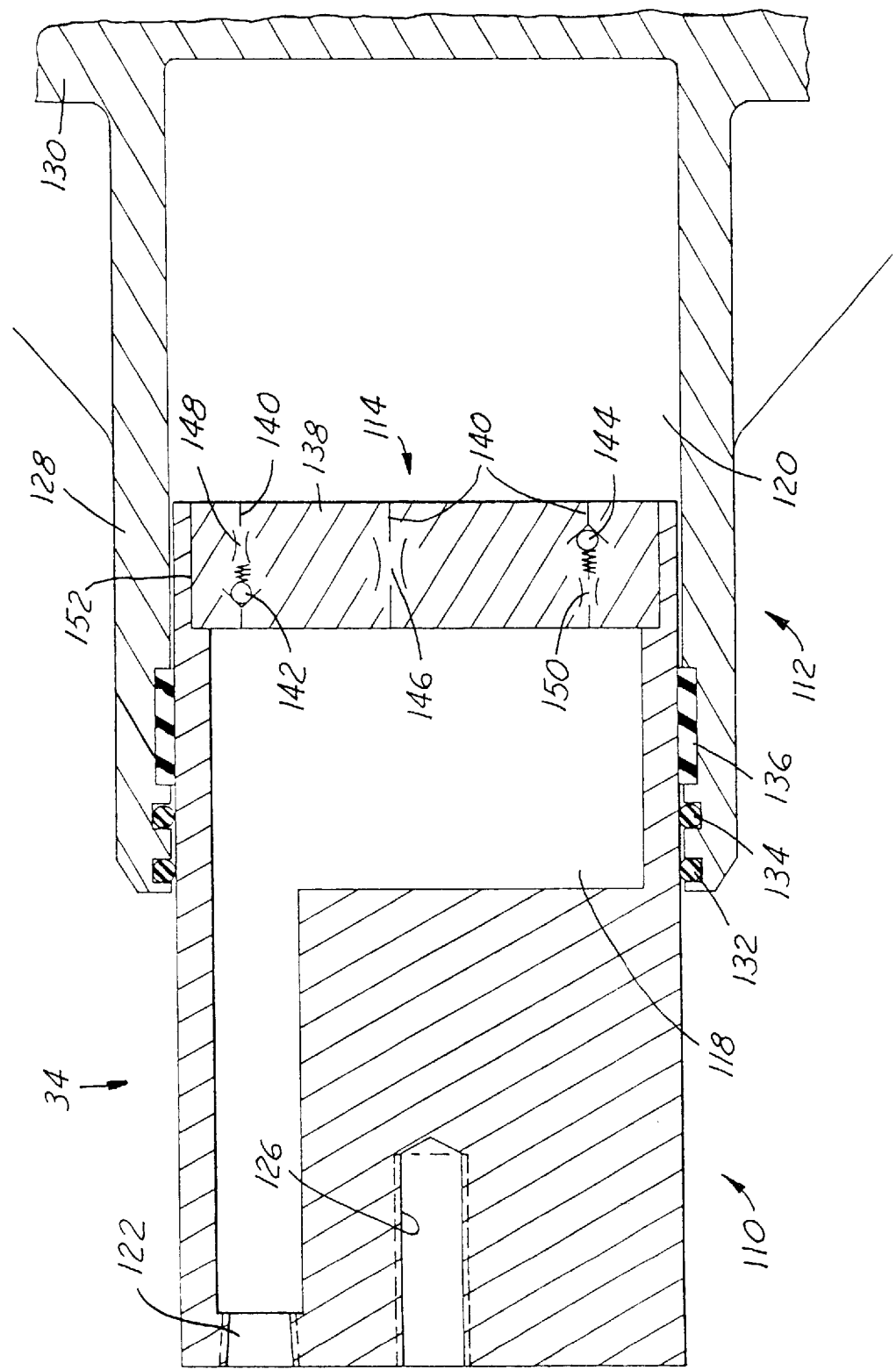
FIG. 3 is a sectional view of a portion of another assembly of the suspension of FIG. 1.

Referring now to FIG. 3, assembly 34 is provided to actuate spring 36 and to provide controlled damping of movement by spring 36. Assembly 34 may include members 110, 112 and a damping control device 114. Members 110, 112 are arranged in telescoping relation along an axis 116 that may extend generally horizontally relative to earth ground as illustrated in FIG. 1. It should be understood, however, that assembly 34 may be disposed in a variety of locations and orientations within vehicle 10 without departing from the spirit of the present invention. Assembly 34 may, for example, be disposed about an axis 116 that extends generally vertically relative to earth ground to allow spring 36 to act and react in a generally vertical direction. Members 110, 112 define a fluid chamber 118 of constant size and a fluid chamber 120 of variable size.

Member 110 provides a reservoir for fluid transferred between assemblies 32, 34 during compression and rebound. Member 110 may be made from conventional metals and metal alloys and the outer surface of member 110 may be generally cylindrical in shape. Member 110 defines chamber 118 in which a fluid, such as hydraulic fluid, may be disposed and also defines a fluid passage 122 extending from chamber 118. Referring to FIG. 1, passage 122 may be sized to receive a connector 124 at one end of fluid conduit 84 connecting passage 122 to passage 80 in member 40 of assembly 32. Conduit 84 places chamber 50 of assembly 32 in fluid communication with chamber 118 of assembly 34. The length of conduit 84 may be varied to allow assembly 34 to be located at varying distances relative to assembly 32. Referring again to FIG. 3, member 110 may further define a closed bore 126 proximate one end of member 110. As illustrated in FIG. 1, bore 126 may be configured to receive a fastener such as a screw or bolt that is used to couple member 110 to frame 16 of vehicle 10. In the illustrated embodiment, member 110 is coupled to rail 24 of frame 16. It should be understood, however, that member 110 may be coupled to frame 16 at a variety of locations depending upon the placement of assembly 34 within vehicle 10.

Member 112 is provided to selectively compress spring 36 and may be made from conventional metals and metal alloys. Member 112 includes a generally cylindrical base 128 having an inner diameter sized to received member 110 and a piston 130 (best shown in FIG. 1) coupled to base 128. Piston 130 may be integral with base 128. Together with member 110 and damping control device 114, base 128 and piston 130 define chamber 120 in which a fluid, such as hydraulic fluid, may be disposed. Base 128 also defines a plurality of grooves in a radially inner surface that are configured to receive seals 132, 134, 136. Seals 132, 134, 136 engage a radially outer surface of member 110 and prevent fluid from leaking from chamber 120. Piston 130 is configured to actuate spring 36. In the illustrated embodiment, spring 36 comprises an air spring. It should be understood, however, that spring 36 may comprise a mechanical spring and that the size, shape, and configuration of piston 130 may vary as a result.

Damping control device 114 is provided to dampen movement of suspension 18 during compression and of spring 36 during rebound. Device 114 may include a housing 138 have a plurality of fluid passages 140 and a pair of valves 142, 144 disposed within the passages 140 in a parallel arrangement. Device 114 may also include an orifice 146 in parallel with valves 142, 144 and orifices 148, 150 in series with valves 142, 144, respectively, to allow fluid to bleed between chambers 118, 120 and allow greater control of fluid flow.

Housing 138 provides structural support for device 114 and places chambers 118, 120 in fluid communication. Housing 138 may be made from conventional metals and metal alloys and is coupled to member 110 through, for example, the interaction of mating threads on housing 138 and member 110, one or more welds or a press fit. Housing 138 may be generally circular in shape and the outer diameter of housing 138 is generally about equal to the inner diameter of an end portion of member 110 that defines a shoulder 152 configured to engage housing 138.

Valve 142 controls the flow of fluid from chamber 118 to chamber 120 during compression of suspension 18 and may comprise a regulating valve. During compression, fluid is received in chamber 118 through conduit 84 from chamber 50 of assembly 32. Because the size of chamber 118 is fixed, fluid flows from chamber 118 to chamber 120. Valve 142 dampens this fluid flow by requiring a predetermined pressure differential between chambers 118, 120 to allow fluid flow.

Valve 144 controls the flow of fluid from chamber 120 to chamber 118 during rebound of suspension 18 and may also comprise a regulating valve. During rebound, spring 36 urges member 112 over member 110 (i.e. member 110 moves into member 112). As a result, the size of chamber 120 decreases and fluid pressure forces fluid to flow from chamber 120 to chamber 118. Valve 144 dampens this fluid flow by requiring a predetermined pressure differential between chambers 118, 120 to allow fluid flow.

Referring again to FIG. 1, spring 36 is provided to dampen movement of frame 16 relative to movement of axle 12 and wheel assemblies 14 as tires 22 follow the road contour. Spring 36 is conventional in the art and may comprise an air spring (as shown in the illustrated embodiment) or a mechanical spring. In the illustrated embodiment, assembly 34 and spring 36 have been positioned so as to allow spring 36 to act and react along a generally horizontal axis 116 relative to earth ground. As a result, spring 36 abuts against vertically descending wall 30 of cross-member 28 of frame 16. It should be understood, however, that assembly 34 and spring 36 may be oriented in a variety of ways (including in a generally vertical direction relative to earth ground) because the inventive suspension allows spring 36 to be located remotely from axle 12.

A suspension in accordance with the present invention has several advantages relative to conventional vehicle suspensions. First, the inventive suspension enables the spring or springs of the suspension to be mounted remotely from the vehicle axle. As a result, less clearance is required in the area around the axle to accommodate the spring(s) thereby enabling easier design and packaging of suspension systems. Second, the inventive suspension also provides greater roll stiffness than conventional systems by moving the reaction points of the spring further outboard. In particular, and with reference to FIG. 1, assembly 32 may be mounted between the axle 12 and vehicle frame 16 outboard of the longitudinal frame rail 24 of the vehicle-unlike most conventional mechanical and air springs-because assembly 32 can operate a higher working pressures and, therefore, has a smaller diameter than conventional mechanical and air springs. Third, the inventive suspension contains compression and rebound damping forces within assemblies 32, 34 and separates the rebound damping required for spring 36 from that required for the unsprung mass of vehicle 10.

While the invention has been particularly shown and described with reference to the preferred embodiments thereof, it is well understood by those skilled in the art that various changes and modifications can be made in the invention without departing from the spirit and scope of the invention.

I claim:

1. A suspension for a vehicle, comprising:
   a first assembly including:
     a first member;
     a second member arranged in telescoping relation with said first member of said first assembly for relative movement along a first axis; and,
     a damping control device
   said first assembly defining first, second, and third fluid chambers and said damping control device of said first assembly controlling fluid flow between said first and second fluid chambers of said first assembly;
   a second assembly including
     a first member;
     a second member arranged in telescoping relation with said first member of said second assembly for relative movement along a second axis; and,
     a damping control device
   said second assembly defining first and second fluid chambers and said damping control device of said second assembly separating said first and second fluid chambers and controlling fluid flow between said first and second fluid chambers of said second assembly, said first fluid chamber of said second assembly being of constant size and in fluid communication with said third fluid chamber of said first assembly and said second fluid chamber of said second assembly being of variable size; and, a spring disposed against a frame of said vehicle and controlled responsive to movement of said second member of said second assembly.

2. The suspension of claim 1 wherein said first member of said first assembly includes:

a housing;

a piston disposed within said housing; and, means for biasing said piston in a first direction within said housing to urge fluid to flow from said first chamber of said first assembly to said second chamber of said first assembly.

3. The suspension of claim 1 wherein said first member of said first assembly is coupled to an axle of said vehicle.

4. The suspension of claim 1 wherein said second member of said first assembly is coupled to a frame of said vehicle.

5. The suspension of claim 1 wherein said first axis extends generally vertically relative to earth ground.

6. The suspension of claim 1 wherein said damping control device of said first assembly includes a first valve regulating the flow of fluid from said second fluid chamber of said first assembly to said first fluid chamber of said first assembly during rebound.

7. The suspension of claim 1 wherein said second axis extends generally horizontally relative to earth ground.

8. The suspension of claim 1 wherein said damping control device of said second assembly includes:

a first valve regulating the flow of fluid from said first fluid chamber of said second assembly to said second fluid chamber of said second assembly during compression; and, a second valve regulating the flow of fluid from said second fluid chamber of said second assembly to said first fluid chamber of said second assembly during rebound.

9. A suspension for a vehicle, comprising:

a first assembly including:
 a first member;
 a second member arranged in telescoping relation with said first member of said first assembly for relative movement along a first axis; and,
 a damping control device having a first valve
said first assembly defining first, second, and third fluid chambers, said first valve of said damping control device of said first assembly regulating the flow of fluid from said second fluid chamber of said first assembly to said first fluid chamber of said first assembly during rebound;

a second assembly including
 a first member;
 a second member arranged in telescoping relation with said first member of said second assembly for relative movement along a second axis; and,
 a damping control device having
  a first valve; and,
  a second valve,
said second assembly defining first and second fluid chambers, said first fluid chamber of said second assembly being of constant size and in fluid communication with said third fluid chamber of said first assembly and said second fluid chamber of said second assembly being of variable size, said damping control device of said second assembly separating said first and second fluid chambers of said second assembly and said first valve of said damping control device of said second assembly regulating the flow of fluid from said first fluid chamber of said second assembly to said second fluid chamber of said second assembly during compression and said second valve of said damping control device of said second assembly regulating the flow of fluid from said second fluid chamber of said second assembly to said first fluid chamber of said second assembly during rebound; and, a spring disposed against a frame of said vehicle and controlled responsive to movement of said second member of said second assembly.

10. The suspension of claim 9 wherein said first member of said first assembly includes:

a housing;

a piston disposed within said housing; and, means for biasing said piston in a first direction within said housing to urge fluid to flow from said first chamber of said first assembly to said second chamber of said first assembly.

11. The suspension of claim 9 wherein said first member of said first assembly is coupled to an axle of said vehicle.

12. The suspension of claim 9 wherein said second member of said first assembly is coupled to a frame of said vehicle.

13. The suspension of claim 9 wherein said first axis extends generally vertically relative to earth ground.

14. The suspension of claim 9 wherein said second axis extends generally horizontally relative to earth ground.

15. A suspension for a vehicle, comprising:

a first assembly including:
 a first member coupled to an axle of said vehicle;
 a second member coupled to a frame of said vehicle and arranged in, telescoping relation with said first member of said first assembly for relative movement along a first axis; and,
 a damping control device
said first assembly defining first, second, and third fluid chambers and said damping control device of said first assembly controlling fluid flow between said first and second fluid chambers of said first assembly;

a second assembly including
 a first member;
 a second member arranged in telescoping relation with said first member of said second assembly for relative movement along a second axis; and,
 a damping control device
said second assembly defining first and second fluid chambers and said damping control device of said second assembly separating said first and second fluid chambers of said second assembly and controlling fluid flow between said first and second fluid chambers of said second assembly, said first fluid chamber of said second assembly being of constant size and in fluid communication with said third fluid chamber of said first assembly and said second fluid chamber of said second assembly being of variable size; and, a spring disposed against a frame of said vehicle and controlled responsive to movement of said second member of said second assembly.

16. The suspension of claim 15 wherein said first member of said first assembly includes:

a housing;

a piston disposed within said housing; and, means for biasing said piston in a first direction within said housing to urge fluid to flow from said first chamber of said first assembly to said second chamber of said first assembly.

17. The suspension of claim 15 wherein said first axis extends generally vertically relative to earth ground.

18. The suspension of claim 15 wherein said damping control device of said first assembly includes a first valve regulating the flow of fluid from said second fluid chamber of said first assembly to said first fluid chamber of said first assembly during rebound.

19. The suspension of claim 15 wherein said second axis extends generally horizontally relative to earth ground.

20. The suspension of claim 15 wherein said damping control device of said second assembly includes:

a first valve regulating the flow of fluid from said first fluid chamber of said second assembly to said second fluid chamber of said second assembly during compression; and, a second valve regulating the flow of fluid from said second fluid chamber of said second assembly to said first fluid chamber of said second assembly during rebound.

\* \* \* \* \*